United States Patent [19]

Dessert

[11] 4,181,188
[45] Jan. 1, 1980

[54] ENERGY EFFICIENT PASSENGER VEHICLE

[76] Inventor: Richard Dessert, 2016 Euclid #1, Santa Monica, Calif. 90405

[21] Appl. No.: 937,503

[22] Filed: Aug. 28, 1978

[51] Int. Cl.$^2$ ............................................. B60L 11/18
[52] U.S. Cl. .................................. 180/2 A; 180/243; 180/220; 180/65 A; 180/65 B; 280/213
[58] Field of Search ................. 180/65 A, 65 R, 65 B, 180/65 D, 65 DD, 65 E, 60, 2, 44 E, 44 M, 34; 280/212, 213, 214, 215

[56] References Cited

U.S. PATENT DOCUMENTS

| | | | |
|---|---|---|---|
| 23,277 | 3/1859 | Thomas | 280/213 X |
| 656,323 | 8/1900 | Hansel | 180/34 |
| 2,177,793 | 10/1939 | Taylor | 280/215 |
| 2,443,565 | 6/1948 | Land | 280/213 |
| 3,419,434 | 12/1968 | Colehower | 136/89 PC |
| 3,444,946 | 5/1969 | Waterbury | 180/65 R |
| 3,884,317 | 5/1975 | Kinzel | 180/65 B |
| 3,971,454 | 7/1976 | Waterbury | 180/65 R |
| 4,141,425 | 2/1979 | Treat | 180/65 DD |

*Primary Examiner*—Joseph F. Peters, Jr.
*Assistant Examiner*—Milton L. Smith
*Attorney, Agent, or Firm*—Frank D. Gilliam

[57] ABSTRACT

An energy efficient passenger carrying vehicle for road use. The vehicle basically comprises a long, narrow body carrying two passengers in a back-to-back relationship. The vehicle is basically a battery powered electric vehicle that can be charged by all free energy sources; namely, the sun, the wind, human muscles and momentum. The vehicle comprises four modules, namely body, solar, and two power modules. An electric power module is located within each end of the body module. This module includes electric motors driving the vehicle supporting wheels and rechargeable batteries to power the motors. Pedals, similar to those on a bicycle, located at each power module, drive generators to help recharge the batteries during operation of the vehicle, or directly help drive the vehicle wheels. A solar module comprising a large electricity generating solar cell panel covers most of the vehicle roof to aid in charging the batteries. Means are provided to tilt the solar cell panel toward the sun about a longitudinal axis. A unique flexible duct below the solar panel serves to cool the cells and, if desired, heat the passenger compartment. Further energy savings are obtained by canting the rear wheels while steering with the front wheels, so that the vehicle moves down the road at a crab angle which provides a sail effect when wind is from the vehicle beam or aft of the beam. Regenerative braking means can be used when slowing down, on a long down grade, when sailing speed is greater than required, or any other time when vehicle momentum is greater than necessary for vehicle operation, to use the excess forward momentum to drive generators to charge the batteries. Thus, a single battery charge will be conserved and vehicle operation will be assisted in a manner giving maximum vehicle range and speed.

6 Claims, 9 Drawing Figures

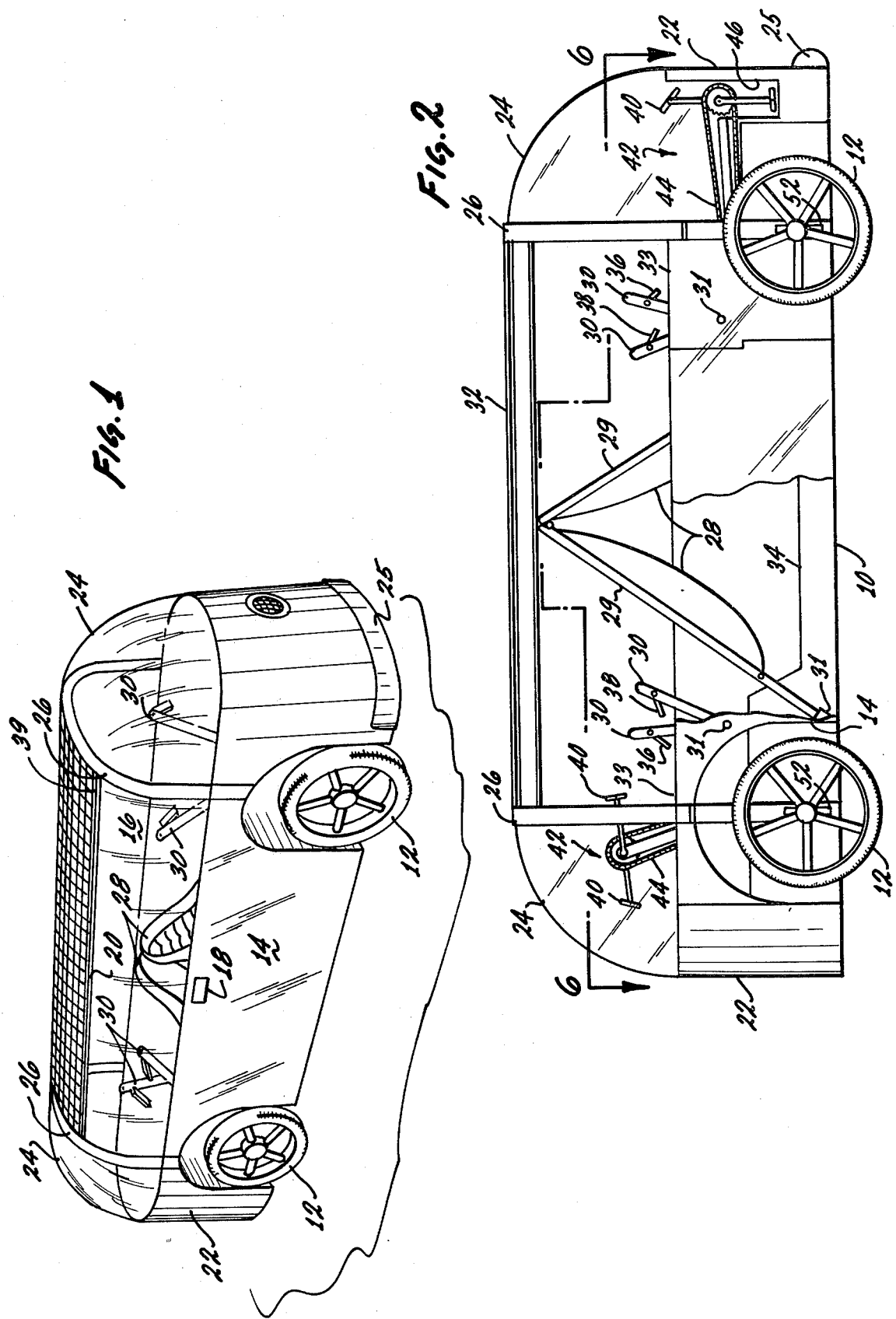

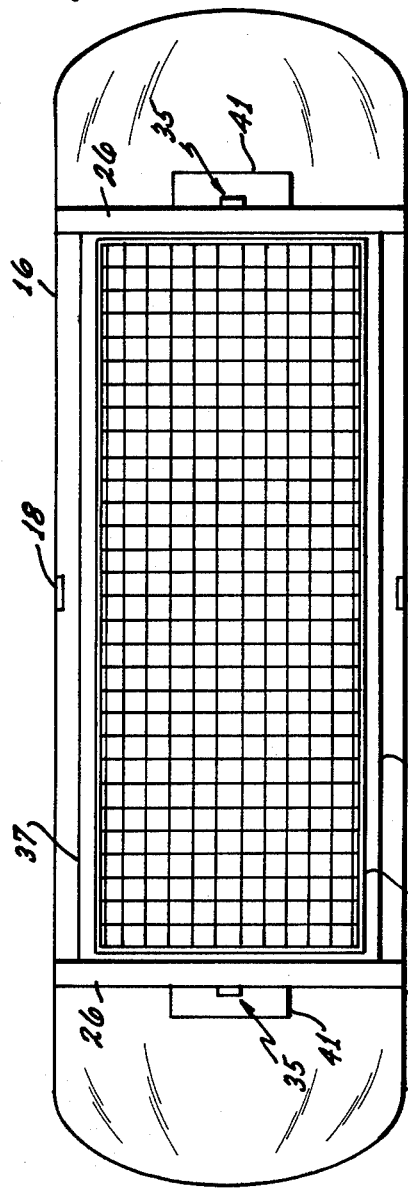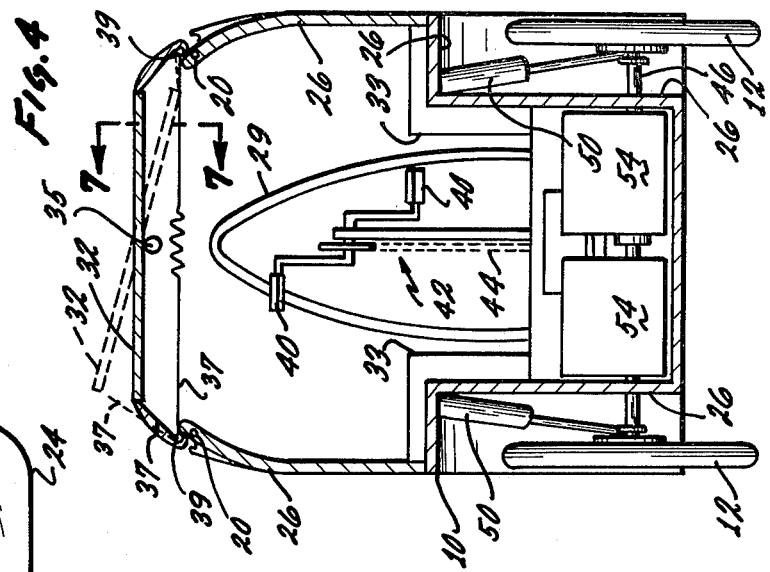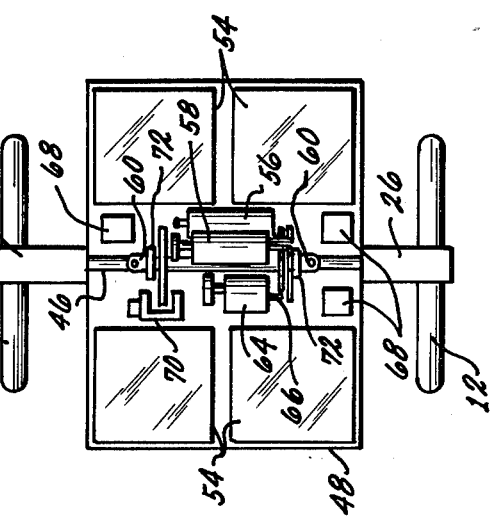

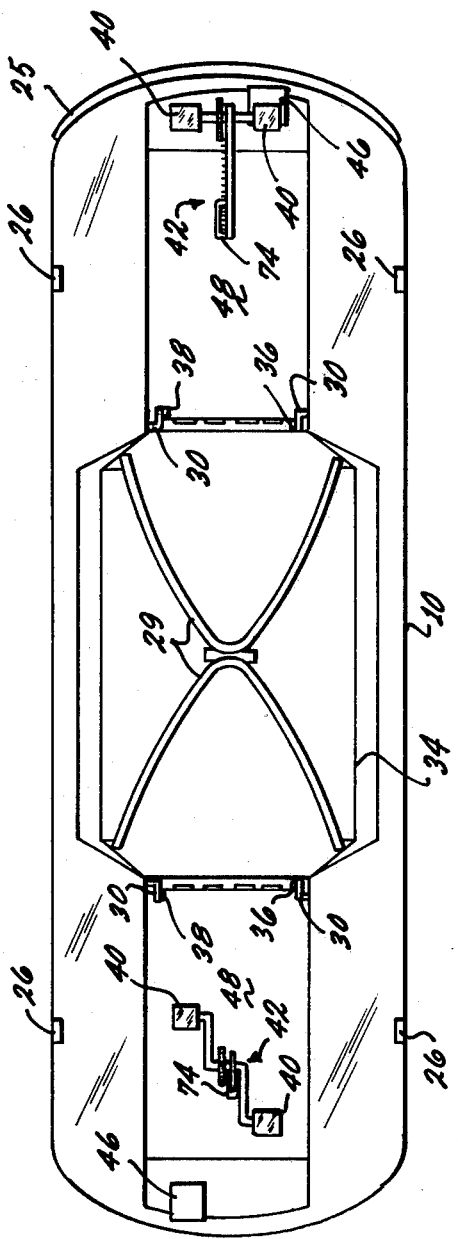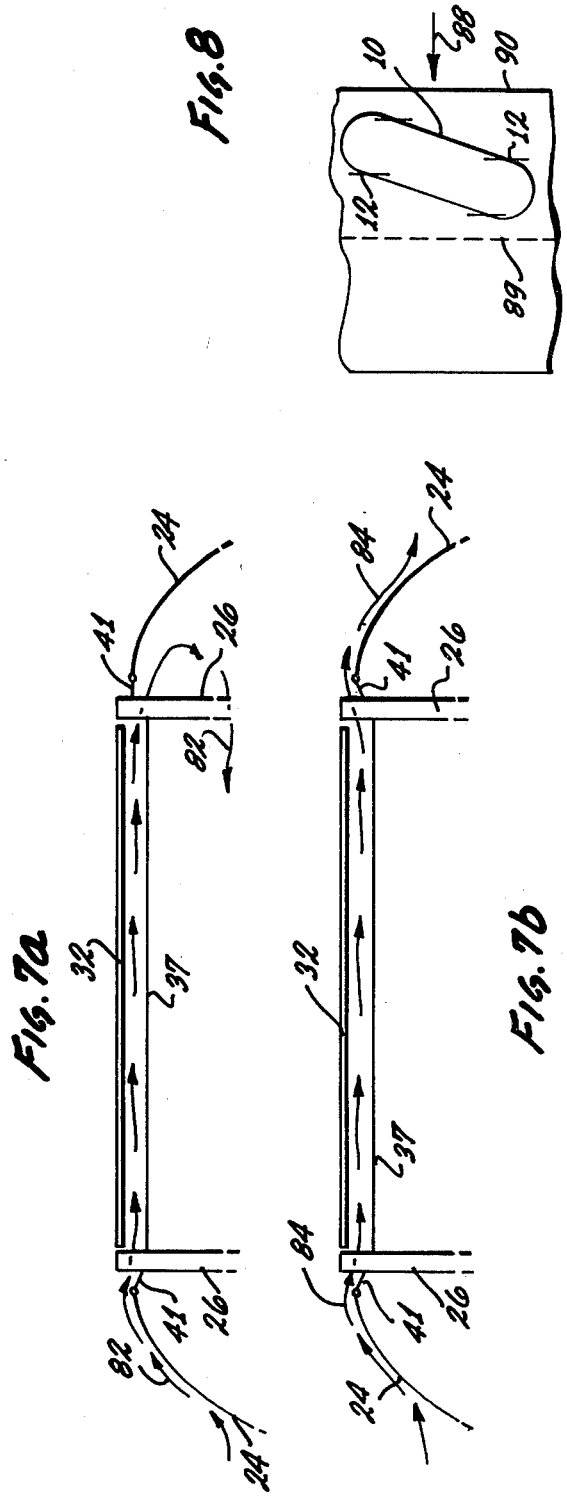

ENERGY EFFICIENT PASSENGER VEHICLE

BACKGROUND OF THE INVENTION

This invention relates in general to passenger vehicles and, more specifically, to an energy efficient fundamentally electrically powered passenger vehicle for road use.

A wide variety of methods of powering passenger vehicles have been proposed to improve energy efficiency and eliminate the need for petroleum-based fuels of the sort used in internal combustion engines. Also, many attempts have been made to reduce or eliminate the air pollution caused by such engines.

Electrically powered vehicles have many advantages, such as quiet operation, absence of air pollution and excellent low speed torque. Unfortunately, battery powered vehicles tend to have short ranges, low speeds and be heavy and expensive due to the number of batteries required. Once the batteries are exhausted, the vehicle is disabled for the considerable time required for recharging. Attempts have been made to partially recharge vehicle batteries while the vehicle is in operation, typically through solar cells or paddle-wheel means in the vehicle airstream, such as are disclosed in U.S. Pat. No. 3,444,946. These expendients, however, provide only slight recharging. Small, stationary solar cells produce relatively little output, since they generally are not oriented toward the sun as the vehicle moves in different directions. The weight of a paddle wheel generating system operated by air flow produced by vehicle movement is relatively great compared to the current generated, so as to provide a low relative efficiency system.

Pedal driven vehicles, such as bicycles, are very energy efficient, requiring no outside energy source. Passenger driven direct pedal drives are not sufficient for larger, enclosed, vehicles, nor for longer trips, or in hilly or rising areas.

Attempts have also been made to use the force of the wind to propel a land vehicle in the manner of a sailboat. A typical land sail vehicle, using a combination of a large sail and bicycle pedals, is shown in U.S. Pat. No. 2,443,565. While such a vehicle might be useful as a recreational vehicle on a large parking lot or a flat dry lake, it is impractical for road use. The sail is not useful when the wind is from much forward of the vehicle beam, since it cannot tack on a highway. Also, a sail extending high above the vehicle would be likely to strike power lines, bridges, etc. crossing above the road.

Thus, there is a continuing need for an energy efficient passenger vehicle having extended range and useful in a variety of weather and road conditions.

SUMMARY OF THE INVENTION

The above noted problems, and others, are overcome in accordance with this invention by a basically battery powered vehicle having several means for improving the energy efficiency of the vehicle. The vehicle basically is constructed from four modules, a body module, a solar module, and two identical power modules. A large, movable for efficient orientation, solar cell module is adapted to recharge the drive batteries during suitable sunny periods. A unique cooling duct arrangement is provided to cool the solar cell panel and, if desired, heat the passenger compartment. A pedal system connected to electrical generating means is adapted to recharge the batteries in the power module by passenger effort, whenever the passengers desire to exert the necessary effort. Regenerative braking means can be used when slowing by braking, on a long down grade, when sailing speed is greater than required, etc., to use the excess forward momentum to drive generators to charge the batteries. Finally, means are provided permitting the entire vehicle to be canted or angled to the roadway to provide a sail effect whenever the wind is from abaft the vehicle beam.

BRIEF DESCRIPTION OF THE DRAWING

Details of the invention, and of a preferred embodiment thereof, will be further understood upon reference to the drawing, wherein:

FIG. 1 is a perspective view of the vehicle of this invention;

FIG. 2 is a side elevation view of the vehicle without body side panels;

FIG. 3 is a top plan view of the vehicle;

FIG. 4 is a partially cut-away end elevation view of the vehicle;

FIG. 5 is a top plan view of a vehicle power module, with the module top cover removed;

FIG. 6 is a horizontal section view taken on line 6—6 in FIG. 2;

FIG. 7a is a schematic vertical section view taken on line 7—7 in FIG. 4, showing the vehicle roof in a first position of the duct vent means;

FIG. 7b is a schematic vertical section view also taken on line 7—7 in FIG. 4, showing the vehicle roof in a second position of the duct vent means; and FIG. 8 is a schematic plan view illustrating wheel canting to provide a sail effect in a beam wind.

DETAILED DESCRIPTION OF THE INVENTION

Referring now to FIG. 1, there is seen a vehicle having a narrow, elongated body 10 with supporting wheels 12 at the four corners. Of course, if desired, a single wheel 12 could be used at either the front or back, providing a tricycle effect, or further wheels could be added.

The lower sides 14 of the vehicle, which may typically be sheet aluminum or fiberglass reinforced plastic over a foam core are secured to a transparent upper portion 16, serving as a wide side window. The entire side panel consisting of portions 14 and 16 can be lifted by handle 18 to pivot around hinge line 20. Suitable releasable braces (not shown) can be provided to hold the side panel open during passenger entrance and egress. A fixed side panel or a similar movable panel may be provided on the opposite side of the vehicle. The front and back ends of the vehicle are covered by a lower panel 22, typically aluminum or fiberglass, and a transparent upper portion 24, typically an acrylic plastic or glass. The various body outer panels are supported by bars 26 which serve as main structural members and roll bars in the event of a roll-over accident. Any suitable bumper 25 may be mounted on the front and/or back of the vehicle.

A pair of seats 28 are located in a back-to-back arrangement with a round rod or tube formed into the approximately eliptical back 29 and a padded cloth seat suspended from the rod in a semi-reclining arrangement. Of course, only one seat could be provided with a cargo space therebehind, or two seats could be arranged in tandem if only one set of controls is provided.

Seat backs 29 extend into sockets 31 on the vehicle floor.

A pair of control levers 30 at each side of each seat are positioned for comfortable operation by passengers in seats 28.

A solar cell panel 32, as described in detail below, covers the center roof section of body 10.

The inside arrangement of the vehicle is schematically illustrated in FIG. 2, with the near side panel 14 partially cut away. The internal floor 34 also serves as a step for passengers entering and leaving seats 28. Once seated, each passenger can easily reach control levers 30, which are pivoted at pivots 31 on side members 33. Each set of control levers 30 may be moved back and forth to steer the wheels 12 at that end. This vehicle can be driven in either direction by the passenger at the "front" end. Ordinarily the wheels at the "back" end will be locked parallel to the vehicle centerline unless the "sail effect" described below is desired. Of course, if desired only one set of controls at one end of the vehicle could be provided. While any suitable steering linkage may be used, a conventional aircraft cable system operating individual wheel turning lever means is preferred. Of course, conventional automobile type steering means, typically using a steering wheel and rack-and-pinion steering means, could be used, or an electrical servo system such as is used in the F-16 aircraft could be used. Any desired gauges (not shown) such as speedometers, odometers, ammeters, voltmeters, etc. may be mounted on the inside of side members 33. Brake levers 36 mounted on one of each set of control levers 30 may actuate a suitable braking system. In a low speed vehicle these levers could mechanically actuate caliper brakes of the sort often used on multispeed bicycles. Preferrably, however, levers 36 actuate electrical disk brakes of the sort illustrated in FIG. 5. Regenerative braking, in which the drive motors act as generators to slow the vehicle while using the extracted energy to charge the batteries, may be used if desired.

A throttle lever 38 is located on the other of each set of control levers 30. This varies the electrical input from the batteries to the drive motors in a conventional manner. Any other desired throttle means may be used, if desired.

While two sets of controls are provided in the embodiment shown to permit either passenger to drive the vehicle in either direction, if desired a single set of controls may be used.

A passenger seated in either seat 28 may comfortably place his feet on pedals 40 when pedal drive assembly 42 is in the position illustrated at the left in FIG. 2. The semi-reclining passenger position is comfortable and provides high pedaling efficiency. Pedal assemblies 42 are connected through conventional drive chain 44 to conventional electric generators (not shown) which aid in recharging the drive batteries. Alternatively, the pedals may directly drive the wheels through conventional gearing. When pedal assemblies 42 are not in use, they can be pivoted about the axis of the lower sprocket (not shown) into pocket 46 in the vehicle end structure as seen at the right end in FIG. 2.

Details of the roof solar cell panel 32 are schematically shown in FIG. 3. Solar panel 32 contains a large number of photovoltaic cells to directly generate electrical energy. As seen in FIGS. 3 and 4, panel 32 is pivotable about pivot 35 which is parallel to the longitudinal centerline of the vehicle. About a 35° adjustment range has been found to increase solar cell efficiency to about 40% on the average over a fixed, horizontal panel. As the panel moves between the position shown in solid lines in FIG. 4 and the position shown in broken lines, a duct 37 of flexible material attached to the longitudinal edges of panel 32 and extending around longitudinal rollers 39 moves along to cover the gap between the edge of the side walls (corresponding to the roll bar 26 locations seen in FIG. 4) to prevent the entry of rain or dust during vehicle operation. The duct 37 forms an enclosed tube parallel to panel 32. The cross-sectional area of duct 37 is substantially constant during panel pivoting movement. To accomodate slight changes, duct material should be slightly elastic, or could be pleated near the lower center and spring loaded to maintain tautness. A pair of adjustable vents 41, as seen in FIG. 3, can be positioned to direct air into and out of duct 37, as described in conjunction with FIGS. 7a and 7b below.

Details of the wheel suspension means and power module are schematically illustrated in FIGS. 4 and 5. In the embodiment shown, a single axis 46 extends between wheels 12 through a power module box 48. Axle 46 is supported by conventional independent McPherson struts 50. Axles 46 extend through slots in roll bars 26 (FIG. 2). Slots 52 guide axle 46 and serve as air outlet vents for vehicle ventilation. While this arrangement is simple, for high speed use a differential and two independent axle portions may be preferred.

Each power module box 48, as shown especially in FIG. 5, contains four batteries 54. Each power module box fits in a cavity in the body module, very low so as to provide a low, stabilizing center of gravity. Axle 46 is driven by motor 56 through transmission 58 and gear means mounted on the fixed center portion of axle 46. The transmission may typically be a free-wheeling bicycle type transmission with coasting properties and no reverse. The fixed center section of axle 46 is connected to the movable, suspended end portions through conventional U-joints 60. Pedal power input means 64 is either connected to an electrical generator to recharge batteries 54, or may be connected to axle 46 through a one-way clutch and gears 66. Conventional electrical control means, such as battery charging means, input means from the solar panel, etc., are contained in boxes 68.

Conventional electrical disk brake means 70 are included for stopping the vehicle. If a differential is included at the center of axle 46, then two disk brake means would be used, one on each side of the differential. Conventional bearings 72 support the ends of the fixed central portion of axle 46.

The interior arrangement of the vehicle body is schematically illustrated in FIG. 6. Floor 34 at the center has a lower area, rising up toward the ends to meet the lower edges of seat bars 29, then cover the edges of power module boxes 48. Two hinged doors cover each of (and permit access through) the tops of boxes 48. Pedal assemblies 42 may be moved between the operating position as shown at the left and the housed position shown at the right, with the lower pedal arm extending into pocket 46. The lower sprocket of each pedal assembly extends at least partially through slots 74 into power boxes 48.

When solar cell panel 32 is in operation and generating electricity, the solar cells tend to heat up, reducing their electrical efficiency. Cooling the solar cells will significantly improve their electrical efficiency. FIGS. 7a and 7b schematically illustrate air cooling these panels, using vents 41 (shown in FIG. 3) and flexible duct 37 (shown in FIG. 4). When both vents 41 are closed, flush with the roof, no air will be admitted into duct 37. When the forward vent 41 is opened by lowering the trailing vent edge, air is directed into duct 37 as indicated by arrows 82 in FIG. 7a. With the aft vent 41 closed, the air (heated by passage adjacent to solar panel 32) will be directed into the vehicle to warm the passenger compartment. In warm weather, both forward and aft vents 41 will be open, as seen in FIG. 7b, so that air flows through duct 37 then back to the atmosphere as illustrated by arrows 84. Vents 41 may be manually or electrically actuated. If desired, conventional thermostatic actuation means may be included to automatically open vents 41 when the temperature of solar panel 32 rises to a selected temperature.

The further energy saving resulting from the ability to obtain a "sail effect" in a cross wind is schematically illustrated in FIG. 8. With no wind, or a wind from forward of the vehicle, the back wheels should be locked parallel to the vehicle centerline and the front wheels should be free for steering. With a significant cross wind, the rear wheels should be "canted" as shown in FIG. 8. The wind comes from the direction indicated by arrows 88. Since the rear wheels are steerable, they may be offset or canted from the vehicle centerline a suitable amount, typically up to about 15° from the centerline, and locked in place. Since the vehicle is relatively narrow, even with the crab angle, the vehicle easily fits within a conventional highway traffic lane between the highway centerline 89 and the road edge 90. Where the wind force is sufficient to move the vehicle without operating the drive motors the motor connections may be reversed so that the motor acts as a generator, with the wind powered wheel motion serving to recharge the batteries.

While certain specific arrangements and proportions are described in the above description of a preferred embodiment, these may be varied, where suitable, with similar results. Other variations, applications and remifications of the present invention will occur to those skilled in the art upon reading this disclosure. These are intended to be included within the scope of this invention, as defined in the appended claims.

I claim:

1. An energy efficient electrically powered vehicle which comprises:
    an elongated substantially closed body having two spaced supporting wheels at each end;
    a power module at each end of said body comprising electrical batteries and electrical drive means adapted to power said wheels;
    an elongated solar panel substantially covered with photovoltaic cells located in the roof of said body adapted to generate electricity to charge said batteries;
    means to pivot said solar panel about substantially the panel longitudinal centerline so that said panel may be oriented towards the sun;
    flexible duct means attached to the longitudinal edges of said panel, extending around rollers overlapping the sides of said body, forming a substantially uniform volume duct parallel to said panel as said panel is pivoted;
    vent means in said body adjacent to the forward and aft ends of said panel adapted to selectively connect said duct to the outside atmosphere and to the interior volume of said vehicle.

2. The vehicle according to claim 1 further including:
    two passenger seats located back-to-back at the center of said body;
    pedal means adjacent to each power module adapted to be operated by the feet of persons in said seats; and
    means to selectively connect said pedal means to one of a generating means to recharge said batteries and a gear means to directly assist in driving said wheels.

3. The vehicle according to claim 2 further including a pocket in each power module adapted to receive one pedal means and means permitting each of said pedal means to be moved between an operative position adjacent to said passenger seats and a housed position in said pockets.

4. The vehicle according to claim 1 wherein the forward pair of wheels may be unlocked for steering and the rear pair of wheels may be locked at a selected offset angle whereby a sail effect may be obtained to increase vehicle forward speed in a side wind condition.

5. The vehicle according to claim 1 further including regenerative braking means to direct braking energy to a generator to aid in recharging said batteries.

6. The vehicle according to claim 1 wherein each seat comprises a fabric supported by a generally elliptical upright tubular frame which serves both to support the seat material and a passenger therein in a semi-reclining position and to serve as a passenger-protecting roll-bar in the event of a vehicle roll over.

* * * * *